(12) United States Patent
Yang et al.

(10) Patent No.: US 7,707,322 B2
(45) Date of Patent: Apr. 27, 2010

(54) AUDIO DATA TRANSMISSION SYSTEM AND AUDIO DATA TRANSMISSION METHOD

(75) Inventors: Ming-Chien Yang, Taipei Shien (TW); Chih-Feng Mai, Taipei Shien (TW); Chin-Tsai Yen, Taipei (TW); Te-Hsien Lai, Taipei Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 170 days.

(21) Appl. No.: 11/878,859

(22) Filed: Jul. 27, 2007

(65) Prior Publication Data

US 2008/0071945 A1    Mar. 20, 2008

(30) Foreign Application Priority Data

Sep. 18, 2006    (TW)    .............................. 95134500 A

(51) Int. Cl.
  *G06F 3/00* (2006.01)
(52) U.S. Cl. .................. 710/2; 710/3; 710/62; 709/223
(58) Field of Classification Search ........................ None
  See application file for complete search history.

(56) References Cited

U.S. PATENT DOCUMENTS 5,671,250 A    9/1997    Bremer et al.

| 2006/0056386 | A1* | 3/2006 | Stogel ......................... 370/351 |
| 2006/0098827 | A1  | 5/2006 | Paddock et al. |
| 2007/0130084 | A1* | 6/2007 | Kay et al. ...................... 705/67 |
| 2008/0209494 | A1* | 8/2008 | Dravida et al. .............. 725/129 |

FOREIGN PATENT DOCUMENTS

| TW | 359056 | 5/1999 |
| TW | 370665 | 9/1999 |
| TW | 485326 | 5/2002 |
| TW | 1245510 | 12/2005 |

* cited by examiner

*Primary Examiner*—Eron J Sorrell
(74) *Attorney, Agent, or Firm*—Rabin & Berdo, P.C.

(57) ABSTRACT

An audio data transmission system applied in a blade PC for connecting a main system unit of a PC blade with an external audio device is provided. The audio data transmission system comprises a peripheral agent device, a peripheral gateway and a connection management unit. The peripheral agent device is connected to the main system unit. The peripheral gateway is connected to the external audio device and is for providing an identification code. In response to the identification code, the connection management unit pairs the peripheral agent device with the peripheral gateway to establish a communication link between the peripheral agent device and the peripheral gateway for transmitting an audio data.

14 Claims, 10 Drawing Sheets

AUDIO DATA TRANSMISSION SYSTEM AND AUDIO DATA TRANSMISSION METHOD

This application claims the benefit of Taiwan application Serial No. 095134500, filed Sep. 18, 2006, the subject matter of which is incorporated herein by reference.

BACKGROUND OF THE INVENTION

1. Field of the Invention

The invention relates in general to an audio data transmission system, and more particularly to an audio data transmission system using blade PC system.

2. Description of the Related Art

According to conventional audio data transmission system applied in a blade PC system, the PC blade of the blade PC is connected to a peripheral audio device at a remote end via a cable such as register jack 45 (RJ45) network cable or optical fiber cable. By doing so, audio data can be transmitted between the PC blade and the peripheral audio device. However, conventional audio data transmission system has still several problems.

According to conventional audio data transmission system, commands and audio data are transmitted between a PC blade and a peripheral audio device via a cable. Such cable connection results in a higher connection cost to conventional audio data transmission system. Furthermore, in conventional audio data transmission system, the PC blade is matched with a corresponding peripheral audio device on a one-to-one basis. Therefore, conventional audio data transmission system can not transmit audio data between peripheral audio devices or between a PC blade and a non-corresponding peripheral audio device.

SUMMARY OF THE INVENTION

The invention is directed to an audio data transmission system and an audio data transmission method. The audio data transmission system and the audio data transmission method of the invention effectively resolve the problems encountered in conventional audio data transmission system that the connection cost is too high, and that the audio data can not be transmitted between the audio devices or between a PC blade and an audio device not corresponding thereto.

According to a first aspect of the present invention, an audio data transmission system applied in a blade PC for connecting a main system unit of a PC blade with an external audio device for enabling the main system unit to transmit an audio data with the external audio device is provided. The audio data transmission system comprises a peripheral agent device, a peripheral gateway and a connection management unit. The peripheral agent device is connected to the main system unit. The peripheral gateway is connected to the external audio device and is for providing a first identification code. In response to the first identification code, the connection management unit pairs the peripheral agent device with the peripheral gateway to establish a communication link between the peripheral agent device and the peripheral gateway. After the connection management unit has paired the peripheral agent device with the peripheral gateway, the external audio device is connected to the main system unit by the audio data transmission system for transmitting an audio data.

According to a second aspect of the present invention, an audio data transmission method applied in a blade PC for transmitting an audio data between a main system unit of a first PC blade and an external audio device for enabling an internal audio device to retrieve the audio data is provided. The audio data transmission method comprises the following steps. Firstly, a first identification code is, provided by a first peripheral gateway coupled to the external audio device. Next, in response to the first identification code, the first peripheral gateway and the first peripheral agent device are paired to establish a first communication link for connecting first client with the first peripheral agent device. Then, the main system unit transmits the audio data with the external audio device via the first peripheral agent device, the first communication link and the first peripheral gateway. Next, a second identification code is provided by a second peripheral gateway coupled to the internal audio device. Then, in response to the second identification code, the second peripheral gateway and the second peripheral agent device are paired to establish a second communication link for connecting a second peripheral gateway with the second peripheral agent device. Then, the second peripheral gateway outputs a talk request signal. Next, in response to the second identification code, whether the second peripheral gateway has the authority to retrieve the audio data is determined: if yes, the next step is performed. Then, in response to the talk request signal, a third communication link is established for connecting the first peripheral agent device with the second peripheral gateway. Afterwards, the first peripheral agent device and the internal audio device transmit the audio data via the first peripheral agent device, the third communication link and the second peripheral gateway.

According to a third aspect of the present invention, an audio data transmission method applied in a blade PC system is provided. The blade PC system comprises a first PC blade, a second PC blade, a first peripheral gateway and a second peripheral gateway, wherein the first peripheral gateway and the second peripheral gateway correspond to the first second PC blade and the second PC blade, respectively. According to the audio data transmission method, the audio data is transmitted between the first internal audio device and the second internal audio device respectively connected to the first peripheral gateway and the second peripheral gateway. The audio data transmission method comprises the following steps. Firstly, the first peripheral gateway provides a talk request signal. Next, the second peripheral gateway receives the talk request signal and determines whether to connect with the first peripheral gateway: if yes, the next step is performed. Then, in response to the talk request signal, a communication link is established between the first peripheral gateway and the second peripheral gateway for connecting the first peripheral gateway with the second peripheral gateway. Afterwards, the audio data is transmitted between the first internal audio device and the second internal audio device via the first peripheral gateway, the communication link and the second peripheral gateway.

The invention will become apparent from the following detailed description of the preferred but non-limiting embodiments. The following description is made with reference to the accompanying drawings.

DETAILED DESCRIPTION OF THE INVENTION

Figure 1:
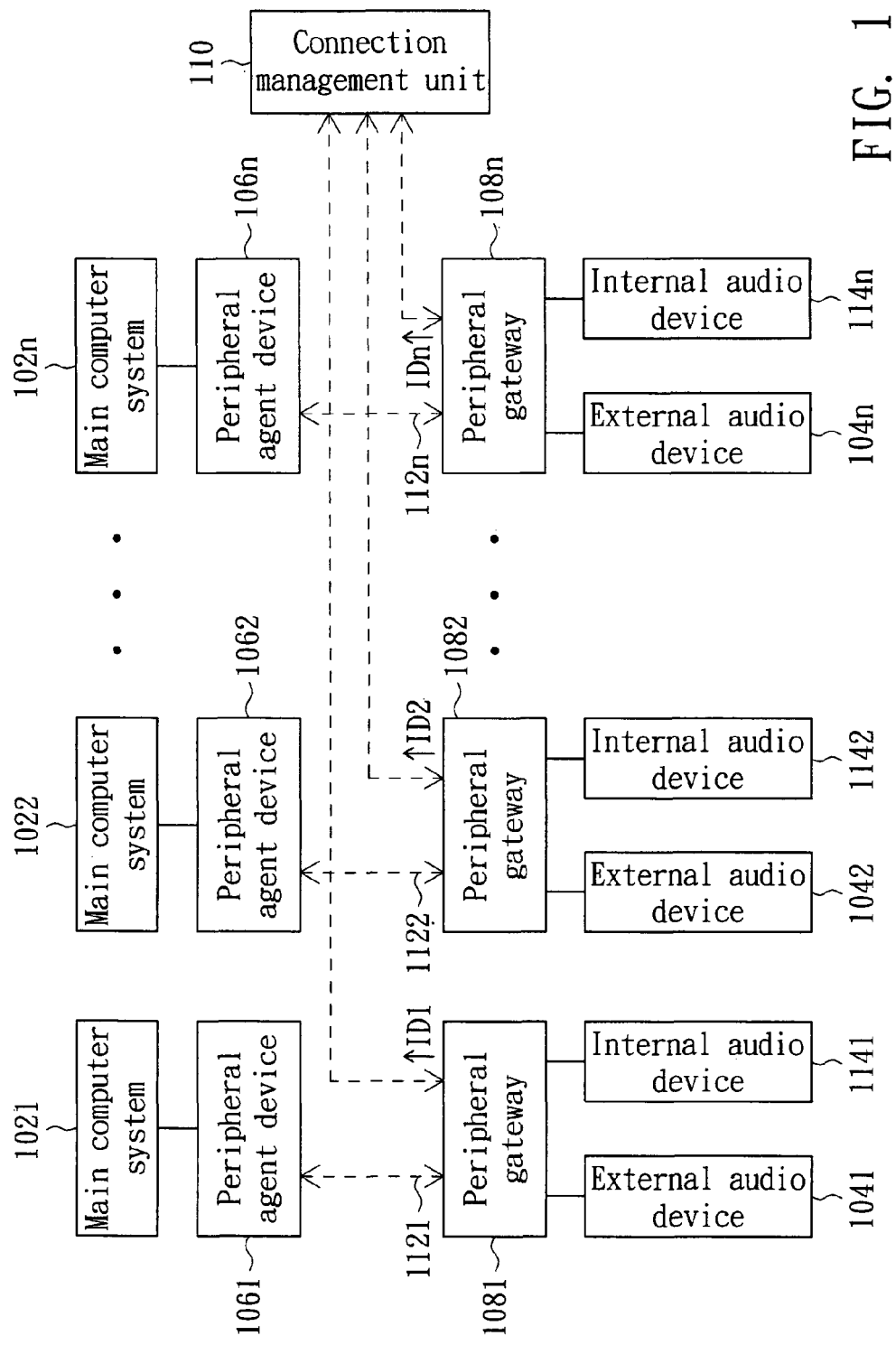
FIG. 1 is a block diagram of an audio data transmission system according to a preferred embodiment of the invention.

Referring to FIG. 1, a block diagram of an audio data transmission system according to a preferred embodiment of the invention is shown. The audio data transmission system connects main system units with external audio devices 1041~104n respectively, so that the main system units transmits audio data with the external audio devices 1041~104n respectively. The audio data transmission system comprises n peripheral agent devices 1061~106n, n peripheral gateways 1081~108n and a connection management unit 110, wherein n is a natural number larger than 1.

The n peripheral agent devices 1061~106n are respectively connected to n corresponding main system units by n peripheral buses. The n peripheral gateways 1081~108n are respectively connected to the n external audio devices 1041~104n for providing n identification codes ID1~IDn. In response to the identification code ID1~IDn, the connection management unit 110 pairs the peripheral agent devices 1061~106n with their corresponding peripheral gateways 1081~108n to establish n communication link 1121~112n between the peripheral agent devices 1061~106n and the peripheral gateways 1081~108n. Thus, the external audio devices 1041~104n are able to be connected to the main system units respectively by the audio data transmission system for transmitting an audio data. The peripheral gateways 1081~108n are further connected to the n internal audio devices 1141~114n respectively by n peripheral buses. The internal audio devices 1141~114n are used for transmitting an audio data between the peripheral gateways 1081~108n.

In the present embodiment of the invention, the main system units are the main computer systems 1021~102n of multiple PC blades of a blade PC. The main computer systems 1021~102n comprise core elements of ordinary computer system such as processor, motherboard, random access memory (RAM), while the remaining peripheral devices such as monitor, speaker, keyboard, mouse and external audio devices 1041~104n are integrated at a remote end and coupled to the peripheral gateways 1081~108n by the peripheral buses. In the present embodiment of the invention, both the external audio devices 1041~104n and the internal audio devices 1141~114n have a set of double sound track output and one single sound track input for transmitting an audio data. In the present embodiment of the invention, the external audio devices 1041~104n are universal serial bus (USB) interface devices connected with the peripheral gateways 1081~108n via USB.

The peripheral gateways 1081~108n receive electrical signals outputted from the peripheral devices and the external audio devices 1041~104n, then the electrical signals are inputted to the main computer systems 1021~102n via corresponding peripheral agent devices 1061~106n. The peripheral agent devices 1061~106n input the response signals generated by the main computer systems 1021~102n to corresponding user peripheral device via the peripheral gateways 1081~108n to achieve two-way data transmission between the main computer systems 1021~102n and the user peripheral device. The peripheral agent devices 1061~106n further simulate the external audio devices 1041~104n as local devices connected to the main computer systems 1021~102n via USB devices, so that the main computer systems 1021~102n are able to be connected to the remote external audio devices 1041~104n via USB devices.

The identification codes ID1~IDn are n sets of user account numbers and passwords. By means of the user interface peripheral device (a keyboard for example) coupled to the peripheral gateways 1081~108n, the user provides user account numbers and passwords to the connection management unit 110 by the peripheral gateways 1081~108n to log onto the audio data transmission system. The connection management unit 110 pairs the peripheral gateways 1081~108n with the peripheral agent devices 1061~106n according to the user account numbers and passwords, so that the user can transmit an audio data by the audio data transmission system.

The connection management unit 110 stores n sets of user account numbers and passwords, and the corresponding relationship between the n sets of user account numbers and passwords and the peripheral agent devices 1061~106n. In response to the n sets of user account numbers and passwords, the connection management unit 110 can respectively pair the peripheral gateways 1081~108n which provides the n sets of user account numbers and passwords with the peripheral agent devices 1061~106n corresponding to the n sets of user account numbers and passwords to establish n communication links 1121~112n between them for transmitting an audio data. The n communication links 1121~112n are transmission control protocol (TCP) links for example. In the present embodiment of the invention, the connection management unit 110 can further receive a user request signal to enter a specific application mode of the audio data transmission system. The present embodiment of the invention is further exemplified by various modes of the audio data transmission system including the monitoring mode, the broadcasting mode, the one-to-one talk mode and the conference mode.

Figure 2:
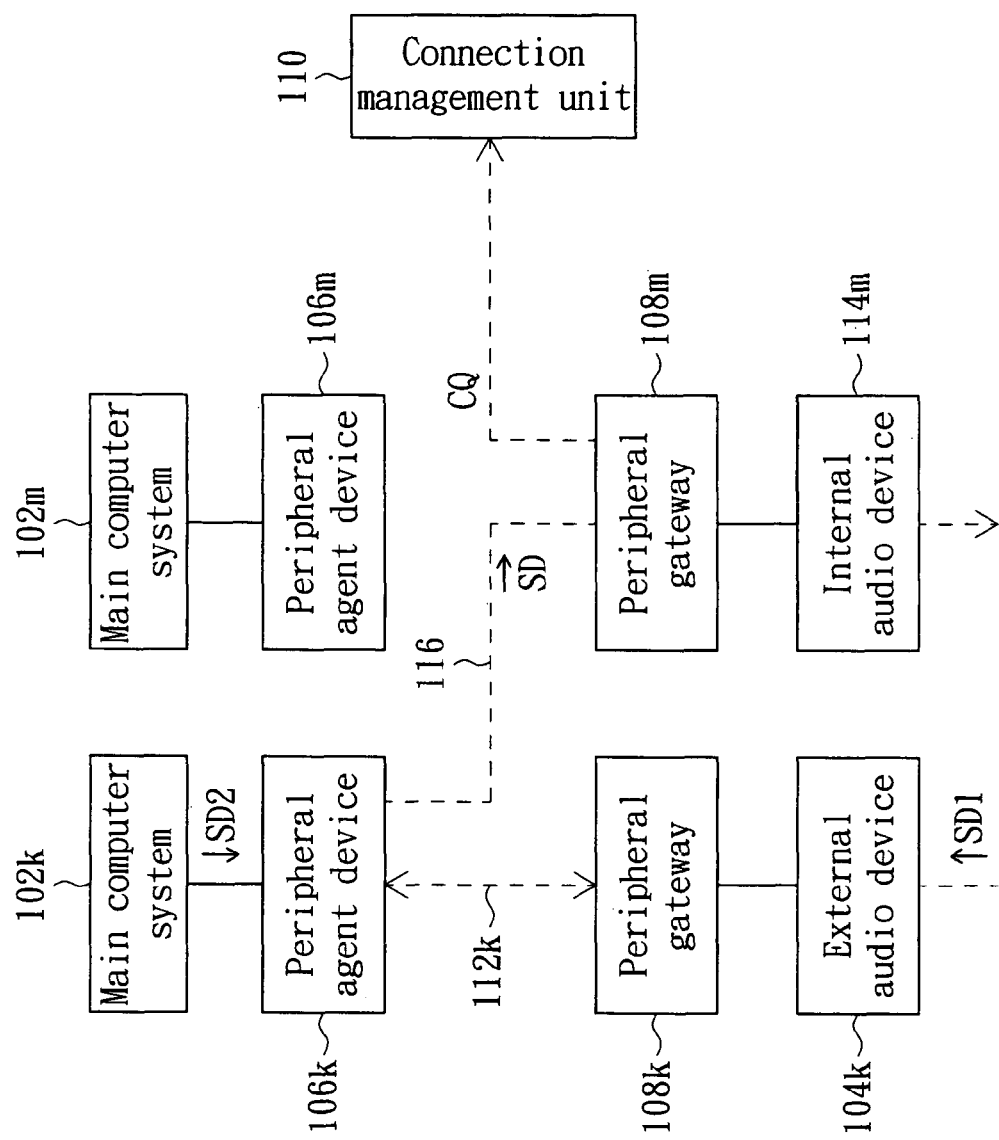
FIG. 2 is a diagram showing the data flow of the audio data when the audio data transmission system of FIG. 1 enters monitoring mode.

Referring to FIG. 2, a diagram showing the data flow of the audio data when the audio data transmission system of FIG. 1 enters monitoring mode is shown. The present embodiment of the invention is exemplified by the system monitoring personnel's operation of monitoring the transmission of audio data SD1 and SD2 between the external audio device 104k and the main computer system 102k by a user having low authority, wherein m and k are a natural number smaller than or equal to n.

The user having low authority inputs his or her user account numbers and passwords to log onto the audio data transmission system via the peripheral gateway 108k, and the connection management unit 110 pairs the peripheral gateway 108k with the peripheral agent device 106k according to the user account numbers and passwords for connecting the main computer system 102k with the external audio device 104k. Thus, the user having low authority can transmit audio data SD1 and SD2 with the main computer system 102k via the external audio device 104k.

When the system monitoring personnel is going to monitor the audio data SD1 and SD2 transmitted between the user having low authority and the main system unit 102k via the external audio device 104k, the system monitoring personnel inputs user account numbers and passwords via the peripheral gateway 108m to log onto the audio data transmission system, and the connection management unit 110 pairs the peripheral gateway 108m with the peripheral agent device 106m. The system monitoring personnel further outputs a talk request signal CQ to the connection management unit 110 via the peripheral gateway 108m.

The connection management unit 110 determines whether the system monitoring personnel has the authority to monitor the user having low authority. If yes, the peripheral agent device 106k and the peripheral gateway 108m form a communication link 116. Next, the peripheral agent device 106k mixes, compresses and encrypts two-way audio data SD1 and SD2 to form and output an audio data SD to the peripheral gateway 108m via the communication link 116. After the peripheral gateway 108m has decrypted and de-compressed the audio signal SD, the audio data SD1 and SD2 are played by the internal audio device 114m. Thus, the system monitoring personnel, by means of the audio data transmission system of the present embodiment of the invention, can monitor the audio data transmitted between the user having low authority and the main computer system 102k via the external audio device 104k.

Figure 3:
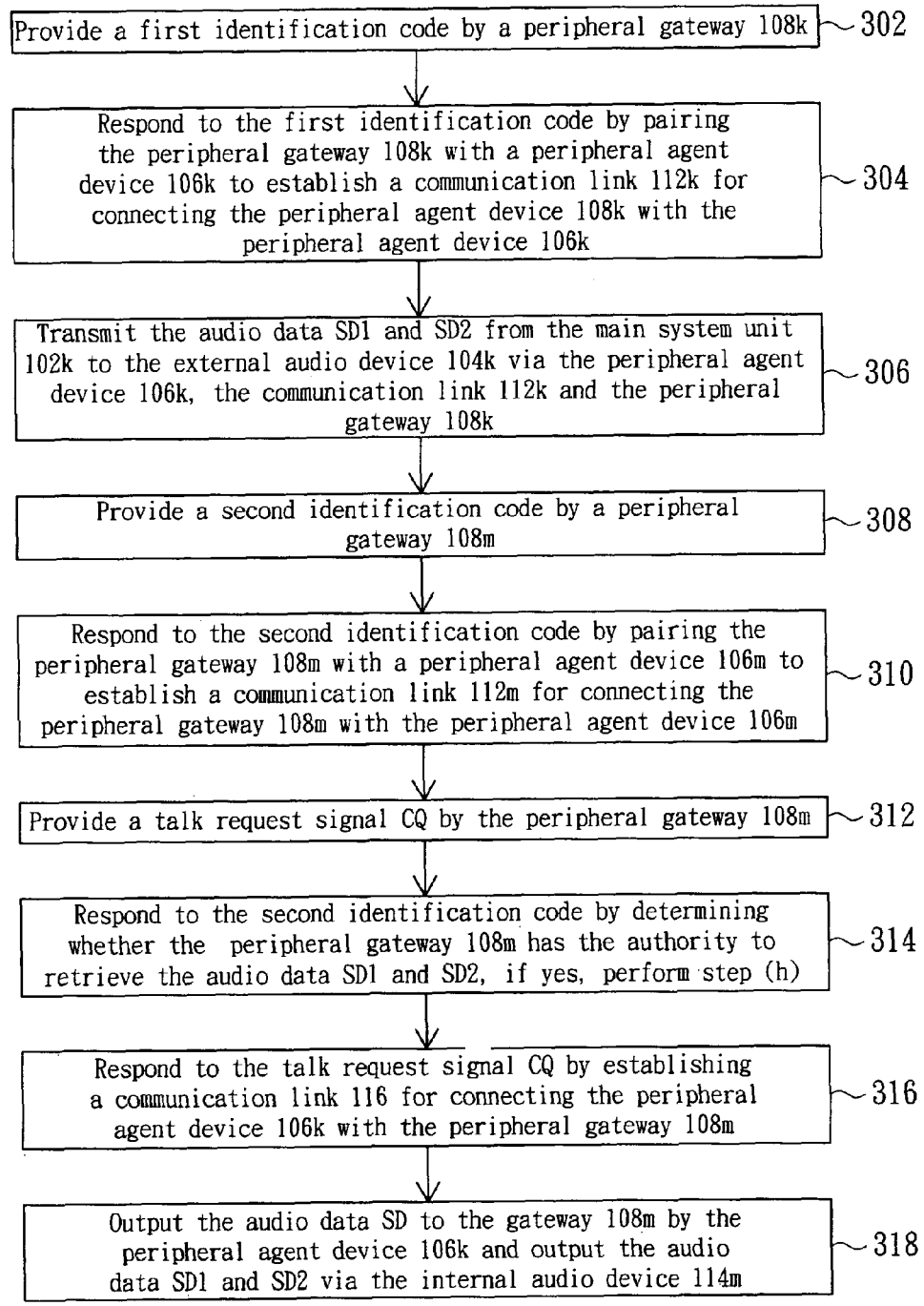
FIG. 3 is a flowchart of an audio data transmission method when the audio data transmission system of FIG. 1 enters monitoring mode.

Referring to FIG. 3, a flowchart of an audio data transmission method when the audio data transmission system of FIG. 1 enters monitoring mode is shown. As indicated in step 302, the user having low authority provides a first identification code through the peripheral gateway 108k. Next, as indicated in step 304, in response to the first identification code provided by the user having low authority, the connection management unit 110 pairs the peripheral gateway 108k with the peripheral agent device 106k to establish a communication link 112k for connecting the peripheral gateway 108k with the peripheral agent device 106k. Then, as indicated in step 306, the main computer system 102k transmits audio data SD1 and SD2 to the external audio device 104k via the peripheral agent device 106k, the communication link 112k and the peripheral gateway 108k.

As indicated in step 308, the system monitoring personnel provides a second identification code through the peripheral gateway 108m. Next, as indicated in step 310, in response to the second identification code provided by the system monitoring personnel, the connection management unit 110 pairs the peripheral gateway 108m with the peripheral agent device 106m to establish a communication link 112m for connecting the peripheral gateway 108m with the peripheral agent device 106m.

Then, as indicated in step 312, the peripheral gateway 108m outputs a talk request signal CQ to the connection management unit 110. Next, as indicated in step 314, in response to the user account number provided to the system monitoring personnel by the peripheral gateway 108m, the connection management unit 110 determines whether the system monitoring personnel has the authority to monitor the user having low authority. If yes, step 316 is performed. As indicated in step 316, in response to talk request signal CQ, the peripheral agent device 106k establishes a communication link 116. Afterwards, as indicated in step 318, the peripheral agent device 106k outputs an audio data SD to the peripheral gateway 108m via the communication link 116, and the peripheral gateway 108m outputs the audio data SD1 and SD2 via the internal audio device 114m. In the present embodiment of the invention, the communication link 116 is a TCP link for example.

Figure 4:
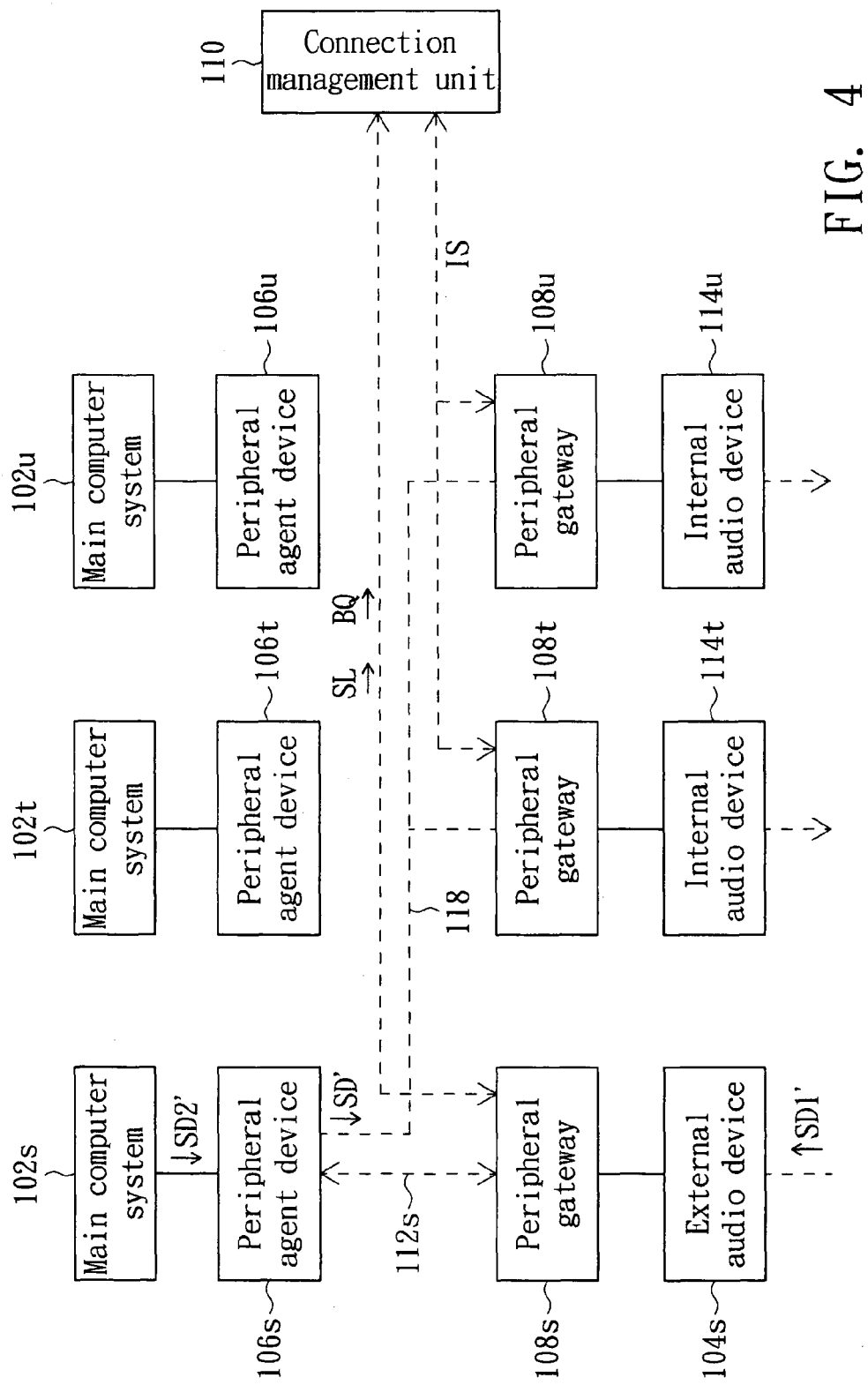
FIG. 4 is a diagram showing the data flow of the audio data when the audio data transmission system of FIG. 1 enters broadcasting mode.

Referring to FIG. 4, a diagram showing the data flow of the audio data when the audio data transmission system of FIG. 1 enters broadcasting mode. The tutor and the student use the audio data transmission system of the invention for the broadcasting of teaching. The tutor transmits the audio data SD1' and SD2' with the main computer system 102s through the external audio device 104s and the audio data transmission system for example, and broadcasts the audio data SD1' and SD2' to the peripheral gateways 108t and 108u which the student has logged onto, so that the student can receive the audio data SD1' and SD2' via the internal audio devices 104t and 104u. Examples of the audio data SD1' and SD2' include teaching audio data, wherein s, t and u are natural numbers smaller than or equal to n.

The student inputs his or her user account numbers and passwords via the peripheral gateways 108t and 108u to log onto the audio data transmission system, so that the connection management unit 110 respectively pairs the peripheral gateways 108t and 108u with the peripheral agent devices 106t and 106u. The tutor inputs his or her user account numbers and passwords via the peripheral gateway 108s to log onto the audio data transmission system, so that the connection management unit 110 pairs the peripheral gateway 108s with the peripheral agent device 106s according to the user account numbers and passwords for connecting the main computer system 102s with the external audio device 104s. Next, the tutor transmits teaching audio data with the main computer system 102s.

If the tutor is going to broadcast the teaching audio data to the student, the tutor inputs a broadcasting request signal BQ and a sharing list SL to the connection management unit 110. The connection management unit 110, in response to the broadcasting request signal BQ, requests the peripheral agent device 106s to establish a communication link 118, then the peripheral agent device 106s mixes and compresses the teaching audio data to form and output an audio data SD' via the communication link 118. In the present embodiment of the invention, the communication link 118 is a user datagram protocol (UDP) link.

In the present embodiment of the invention, the sharing list SL is a class name list, wherein the name list also includes the user account numbers of the students who are going to enroll this class. The connection management unit 110, in response to class name list, outputs an information signal IS to inform the students who have already logged onto the audio data transmission system to join the class by receiving the audio data SD' outputted via the UDP link. If the student are going to receive the audio data SD' to join the class, the connection management unit 110 requests the peripheral gateways 108t and 108u to establish a UDP link for receiving the audio data SD'. The peripheral gateways 108t and 108u de-compress the audio signal SD' and then broadcast the teaching audio data via the internal audio devices 114t and 114u respectively. Thus, the tutor can broadcast the teaching audio data to the students through the audio data transmission system of the present embodiment of the invention.

Figure 5:
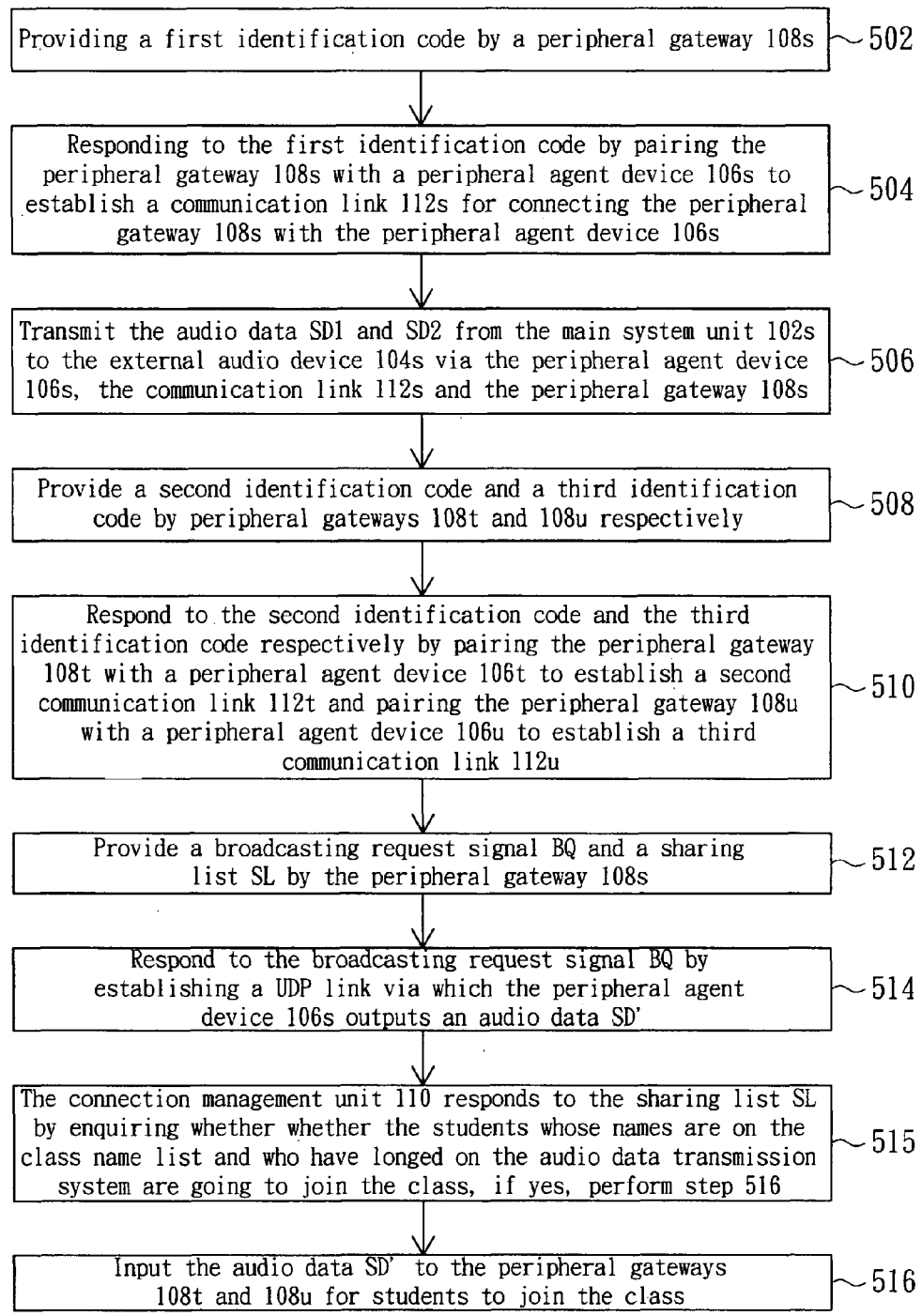
FIG. 5 is a flowchart of an audio data transmission method when the audio data transmission system of FIG. 1 enters broadcasting mode.

Referring to FIG. 5, a flowchart of an audio data transmission method when the audio data transmission system of FIG. 1 enters broadcasting mode is shown. The steps 502~510 are similar to the operational steps of FIG. 3, except that in step 508, a second identification code and a third identification code are respectively provided by peripheral gateways 108t and 108u, and in step 510, the peripheral agent device 106t and the peripheral gateway 108t are paired in response to the second identification code, and the peripheral agent device 106*u* and the peripheral gateway 108*u* are paired in response to the third identification code. The audio data transmission method when the audio data transmission system of the present embodiment of the invention enters broadcasting mode differs with the audio data transmission method when the audio data transmission system enters monitoring mode in the following steps:

In step 512, the peripheral gateway 108*s* provides a broadcasting request signal BQ and a class name list.

In step 514, a UDP link is established in response to the broadcasting request signal BQ, the peripheral agent device 106*s* outputs the audio data SD' via the UDP link.

In step 516, the audio data SD' is inputted to the peripheral gateways 108*t* and 108*u*, so that the students can join the class.

Step 515 comes between step 514 and step 516. In step 515, the connection management unit 110, in response to class name list, enquires whether the students whose names are on the class name list and who have longed on the audio data transmission system are going to join the class. If yes, step 516 is performed.

The audio data transmission system of the present embodiment of the invention further has a compulsory broadcasting mode. When the tutor is going to compulsorily broadcast the teaching audio data to the student, the tutor outputs a compulsory broadcasting request signal (not illustrated) and a class name list to the connection management unit 110. Meanwhile, the connection management unit 110 skips the step (that is, step 515) of enquiring whether the students whose names are on the class name list are going to receive the broadcasting, and directly request a UDP link to be established among the peripheral agent device 106*s*, the peripheral gateway 108*t* and 108*u*. Thus, the tutor, by the audio data transmission system of present embodiment of the invention, can compulsorily broadcast the teaching audio data to the students via the internal audio devices 114*t* and 114*u*.

In the present embodiment of the invention, the tutor shares the teaching audio data with two students when giving a class. However, the tutor can further share the teaching audio data with one, three or more than three students by means of the audio data transmission system of the present embodiment of the invention in giving a class.

Figure 6:
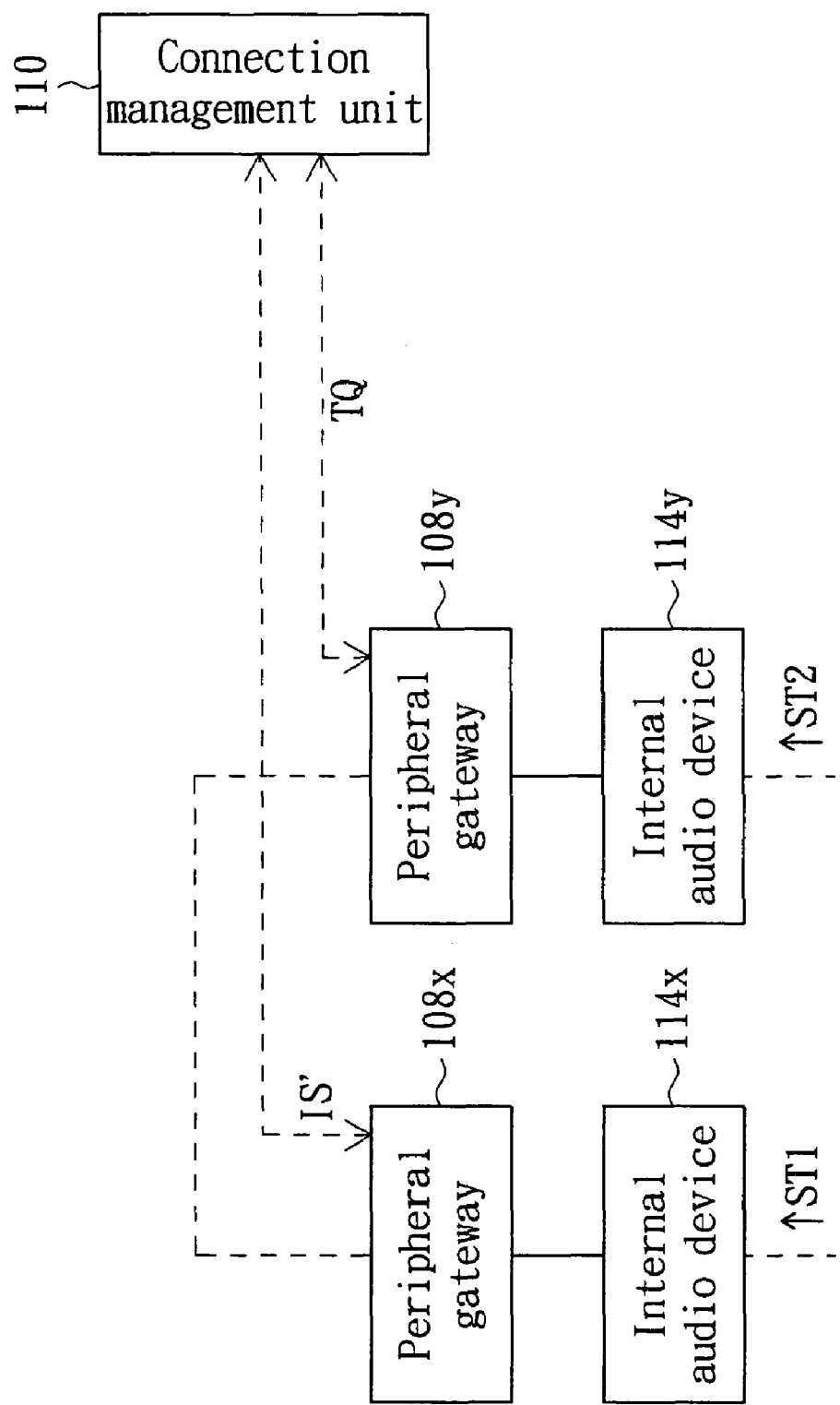
FIG. 6 is a diagram showing the data flow of the audio data when the audio data transmission system of FIG. 1 enters one-to-one talk mode.

Referring to FIG. 6, a diagram showing the data flow of the audio data when the audio data transmission system of FIG. 1 enters one-to-one talk mode is shown. The present embodiment of the invention is exemplified by the case that the first user at the peripheral gateway 114*y* is going to talk with the second user at the peripheral gateway 114*x* by means of the audio data transmission system of the present embodiment of the invention, wherein, both x and y are a natural number smaller than or equal to n.

If the first user is going to talk with the second user by means of the peripheral gateway 114*y* and the peripheral gateway 114*x*, the first user outputs a talk request signal TQ to the connection management unit 110 via the peripheral gateway 114*y*. In response to the talk request signal TQ, the connection management unit 110 outputs an information signal IS' to the peripheral gateway 114*x* to inform the second user via the peripheral gateway 114*x* that the first user is going to talk with him or her. If the second user agrees to talk with the first user, the connection management unit 110 establishes a TCP link between the peripheral gateway 108*y* and the peripheral gateway 108*x*. Next, the peripheral gateways 108*x* and 108*y* respectively compress and encrypt the audio data ST1 and ST2 received via the internal audio devices 114*x* and 114*y* and then output the compressed and encrypted audio data ST1 and ST2 to the peripheral gateways 108*y* and 108*x*. Thus, the first user and the second user can have one-to-one communication by means of the audio data transmission system of the present embodiment of the invention. The audio data ST1 is the first user's voice sensed by the internal audio device 114*x*, and the audio data ST2 is the second user's voice sensed by the internal audio device 114*y*.

Figure 7:
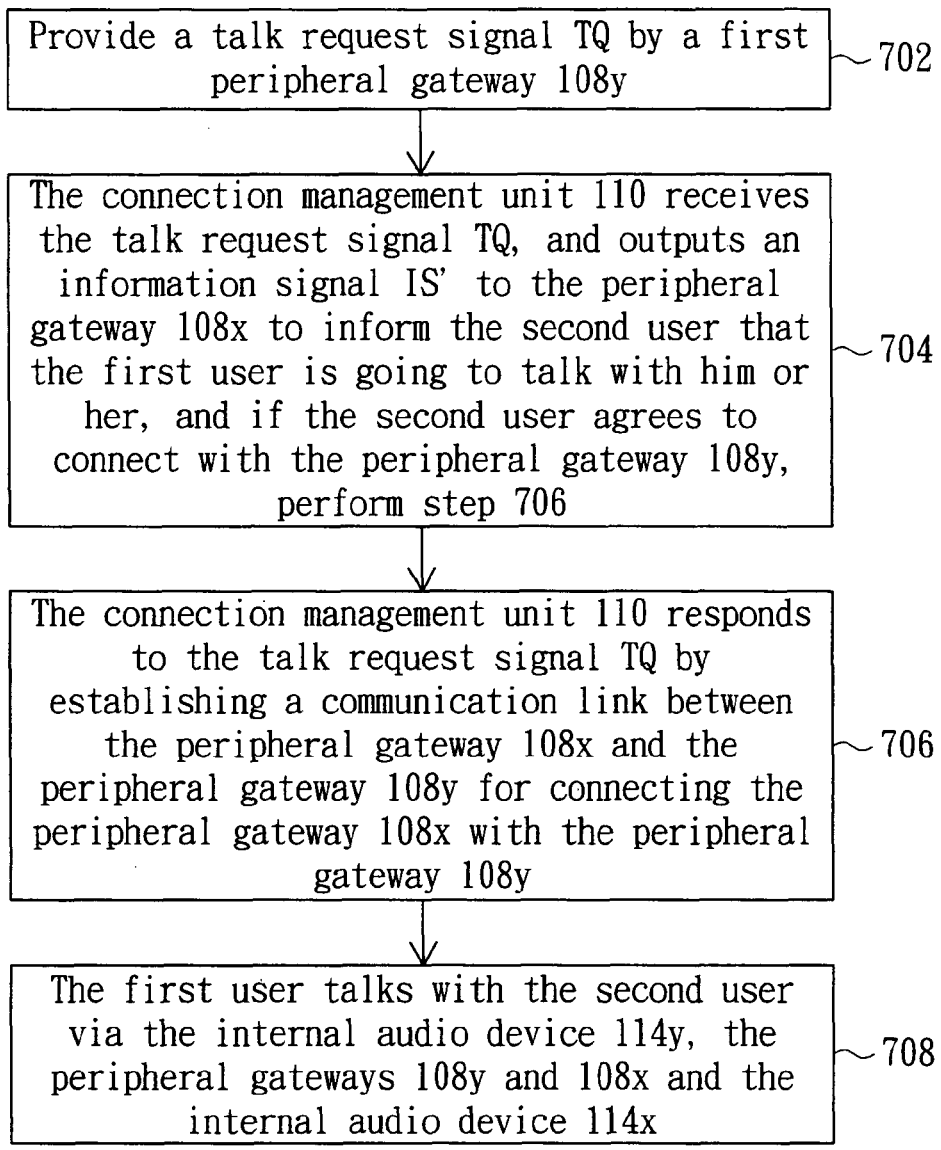
FIG. 7 is a flowchart of an audio data transmission method when the audio data transmission system of FIG. 1 enters one-to-one talk mode.

Referring to FIG. 7, a flowchart of an audio data transmission method when the audio data transmission system of FIG. 1 enters one-to-one talk mode is shown. Firstly, as indicated in step 702, the first user provides a talk request signal TQ by the peripheral gateway 108*y*. Next, as indicated in step 704, the connection management unit 110 receives the talk request signal TQ and outputs an information signal IS' to the peripheral gateway 108*x* to inform the second user that the first user is going to talk with him or her, and if the second user agrees to connect with the peripheral gateway 108*y*, step 706 is performed. As indicated in step 706, in response to talk request signal TQ, the connection management unit 110 establishes a communication link between the peripheral gateway 108*x* and the peripheral gateway 108*y* for connecting the peripheral gateway 108*x* with the peripheral gateway 108*y*. Afterwards, as indicated in step 708, the first user and the second user talk with each other by transmitting the audio data ST1 and ST2 via the internal audio devices 114*y* and 114*x* and the peripheral gateways 108*y* and 108*x*.

Figure 8:
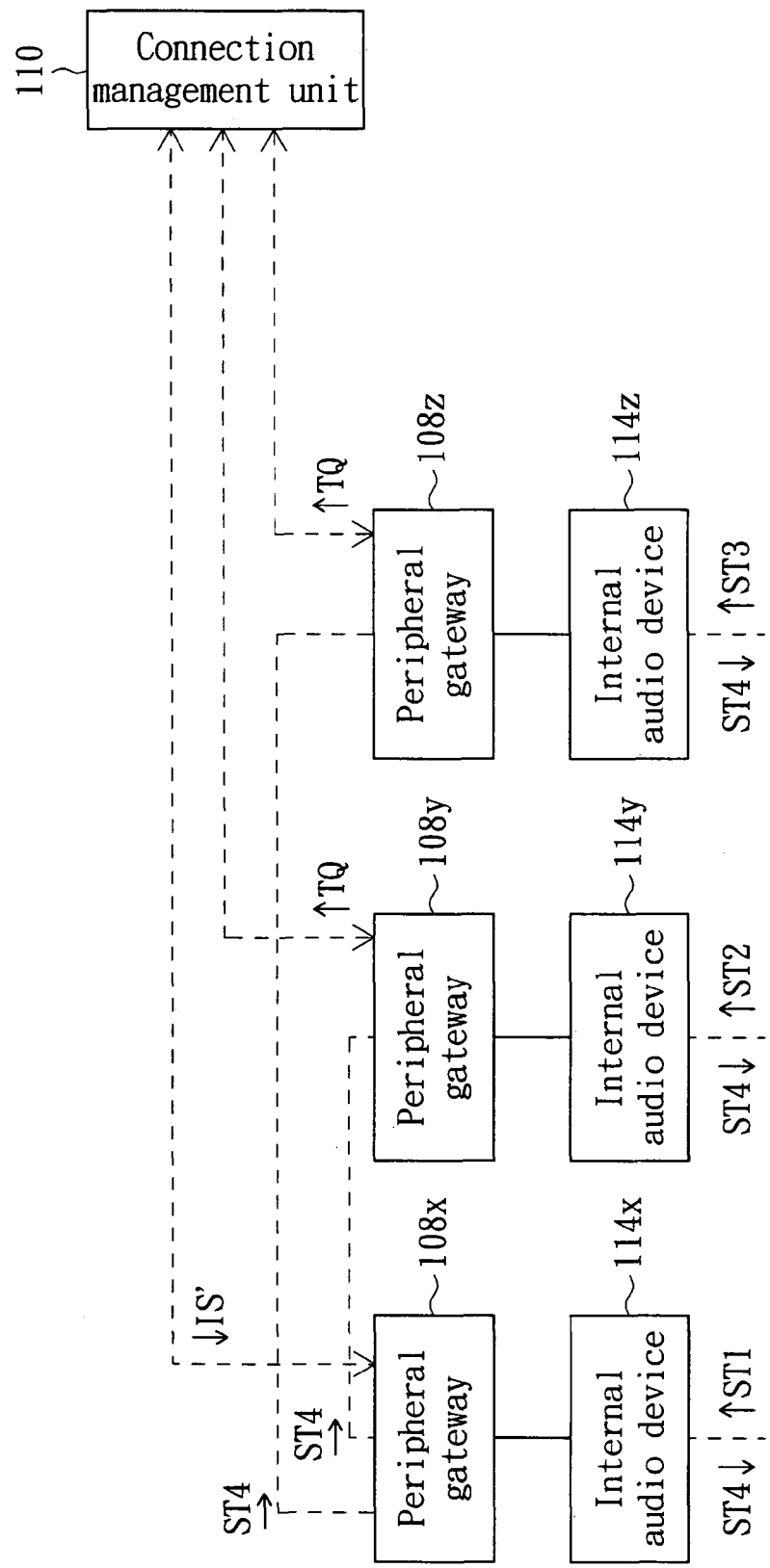
FIG. 8 is a diagram showing the data flow of the audio data when the audio data transmission system of FIG. 1 enters conference mode.

Referring to FIG. 8, a diagram showing the data flow of the audio data when the audio data transmission system of FIG. 1 enters conference mode is shown. The difference between the conference mode and the one-to-one talk mode of the audio data transmission system of the present embodiment of the invention is that in the conference mode, two users respectively provide a talk request signal TQ to the connection management unit 110 by the peripheral gateways 108*y* and 108*z* for communicating with the third user at the peripheral gateway 108*x*. If the third user agrees to talk with the first user and the second user, the connection management unit 110 establishes a TCP link between the peripheral gateways 108*y* and 108*x* and between the peripheral devices 108*z* and 108*x*. The peripheral gateway 108*x* further mixes, compresses and encrypts the received audio data ST1, ST2 and ST3 to generate and output an audio data ST4 to the peripheral gateways 108*y* and 108*z*. After the audio data is de-compressed and decrypted by the peripheral gateways 108*x*, 1108*y* and 108*z*, the audio data ST4 are played through the internal audio devices 114*x*, 114*y* and 114*z*. Thus, three users are able to conduct a conference talk by means of the audio data transmission system of the present embodiment of the invention.

Despite the present embodiment of the invention is exemplified by the conference call of three users, four or more than four users still can conduct a conference call by the audio data transmission system of the present embodiment of the invention.

The peripheral agent devices 1061~106*n* of the present embodiment of the invention are host embedded systems respectively disposed in the same PC blade with corresponding main computer systems of PC blades and connected to corresponding main computer systems 1021~102*n* via peripheral buses. The peripheral gateways 1081~108*n* are client embedded systems. The host embedded system and the client embedded system respectively comprises a host system on chip (SOC) and a client SOC.

Figure 9A:
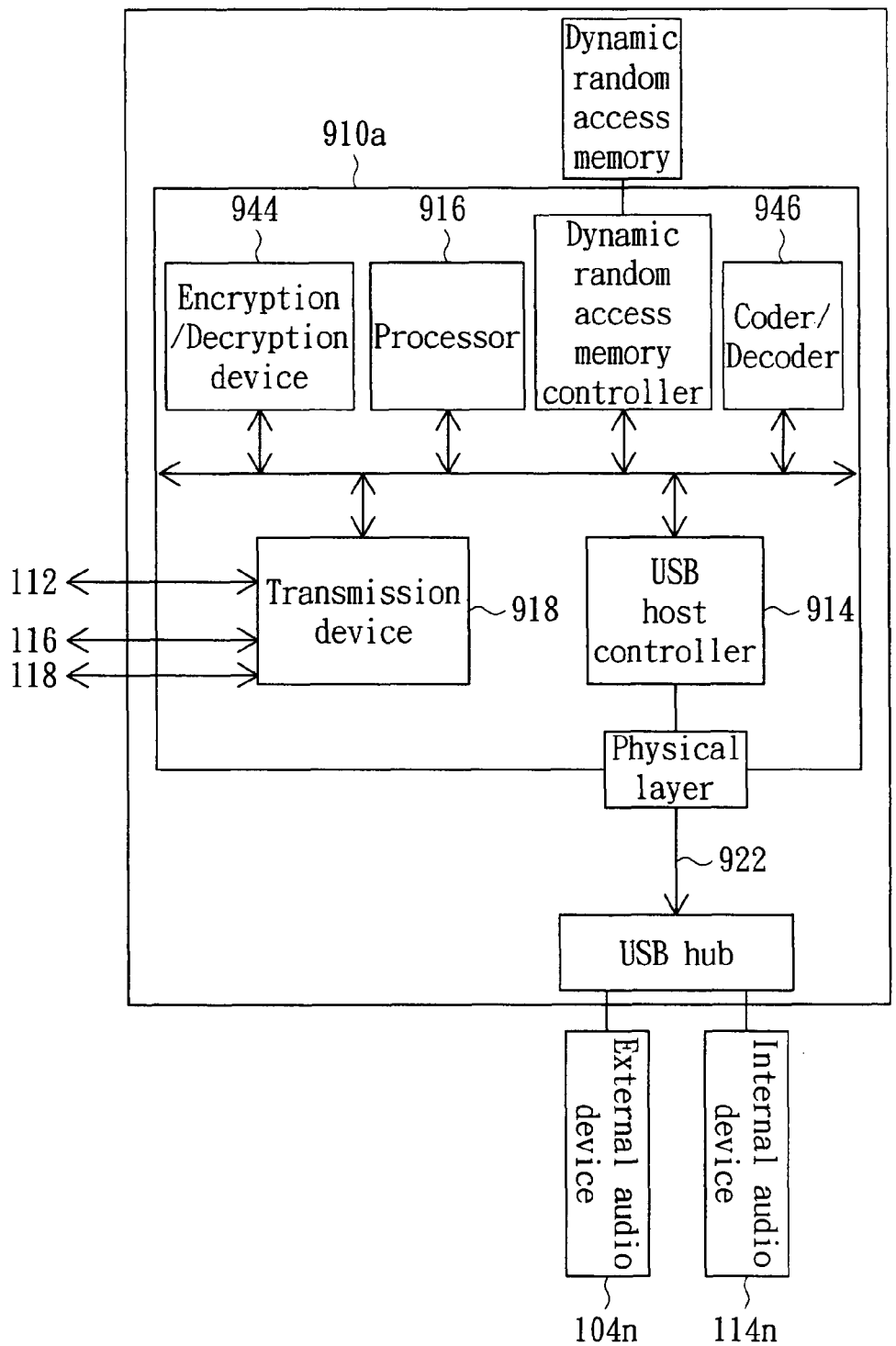
FIG. 9A is a block diagram of a client embedded system.
Figure 9B:
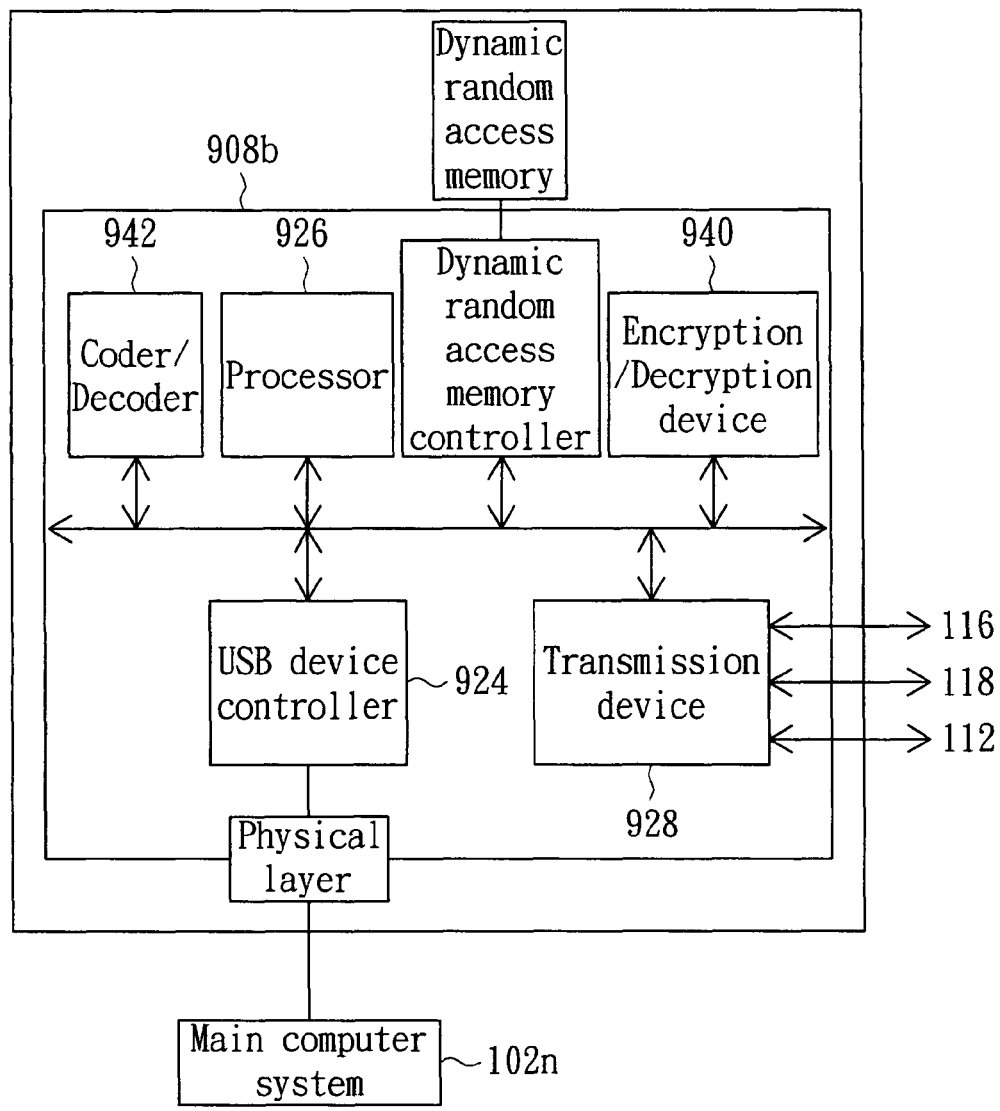
FIG. 9B is a block diagram of a host embedded system.

Referring to FIGS. 9A and 9B. FIG. 9A is an implantation of a client embedded system, FIG. 9B is an implantation of a host embedded system. The processors 916 and 926 are for performing the operational system of the embedded system and performing an application software and driver to drive other hardware of the client SOC 910a and the host SOC 908b. The USB host controller 914 is used as a USB host controller for installing the internal audio device 114n in the client embedded system. The USB device controller 924 is for connecting the external audio device 104n with the main computer system 102n for transmitting an audio data.

The transmission device 918 is controlled by the connection controlling unit 110 to establish a communication link with a host embedded system or a client embedded system. The transmission device 928 is also controlled by the connection controlling unit 110 to establish a communication link with a client embedded system. The communication link of the present embodiment of the invention is a network link, which can be implemented by a wireless network, a cabled network or a mixture of the wireless network and the cabled network. The encryption/decryption devices 940 and 944 are for encrypting/decrypting the audio data to enhance the security during the transmission of the audio data. The coder/decoder (CODEC) 942 and 946 are for compressing the audio data.

In a preferred embodiment of the invention, the two coder/decoder 942 and 946 compress or de-compress the audio data SD, SD', ST1~ST3 by one or several ways of audio encoding such as MPEG 1 layer 3 (MP3) or G.7xx of ITU-U. If the audio data SD, SD1, SD2 and ST1~ST3 are music, then the coder/decoder 942 and 946 compress or de-compress the audio data according to MP3 encoding. If the audio data SD, SD1, SD2 and ST1~ST3 are speech data, the coder/decoder 942 and 946 compress or de-compress the audio data SD, SD', ST1, ST2 and ST3 according to G.7xx encoding. In the present embodiment of the invention, the audio data SD, SD1, SD2 and ST1~ST3 are audio data which are corresponding to the USB audio specification and are processed by pulse code modulation (PCM). The encryption/decryption devices 940 and 944 are encryption/decryption hardware for encrypting the compressed audio data and then outputting the encrypted data via the transmission devices 918 and 928. The transmission devices are, for example, Giga MAC hardware.

Other implementations of the host embedded system or the client embedded system can be achieved by variations of FIG. 9A or FIG. 9B. For example, the encryption/decryption device or the coder/decoder can be achieved by other hardware circuits such as a digital signal processor for example. Besides, in other embodiments, the whole or part of the functions of the encryption/decryption device or coder/decoder can be achieved by software or firmware.

According to the audio data transmission system and the audio data transmission method of the present embodiment of the invention, the peripheral gateway and the peripheral agent device of the audio data transmission system are connected by a connection management unit. Thus, the audio data transmission system and the audio data transmission method of the present embodiment of the invention effectively resolve the problem encountered in conventional blade PC system that the PC blade and the client system are connected on a one-to-one basis via cables and that the audio data can not be transmitted between peripheral audio devices or between a PC blade and a peripheral audio device not corresponding thereto. Thus, the audio data transmission system of the present embodiment of the invention has the advantage of deriving other modes of audio data transmission according to the structure of blade PC system, hence effectively improving the flexibility and application of the audio data transmission system.

Moreover, the audio data transmission system of the present embodiment of the invention uses a connection management device to receive the request signal outputted from a peripheral gateway and a peripheral agent device to establish a communication link for connecting a PC blade with two or more than two audio devices or communication link for connecting two or more than two audio devices. Thus, the audio data transmission system of the present embodiment of the invention further resolves the problem of cost connection occurred to conventional blade PC system which connects the PC blade with peripheral audio devices via cables. Therefore, the audio data transmission system of the present embodiment of the invention further has the advantage of low connection cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An audio data transmission system applied in a blade PC for connecting a first main system unit of a first PC blade with an external audio device for enabling the first main system unit to transmit a first audio data with the external audio device, the blade PC further comprising a second PC blade, the audio data transmission system comprising:

a first peripheral agent device connected to the first main system unit;

a first peripheral gateway connected to the external audio device and used for providing a first identification code;

a second peripheral agent device connected to a second main system unit of the second PC blade;

a second peripheral gateway connected to a first internal audio device and used for providing a second identification code; and a connection management unit responding to the first identification code by pairing the first peripheral agent device with the first peripheral gateway for establishing a first communication link between the first peripheral agent device and the first peripheral gateway;

wherein, the connection management unit responds to the second identification code by pairing the second peripheral agent device with the second peripheral gateway to establish a second communication link between the second peripheral agent device and the second peripheral gateway; and wherein, after the connection management unit has paired the first peripheral agent device with the first peripheral gateway, the external audio device is connected to the first main system unit by the audio data transmission system for transmitting the first audio data.

2. The audio data transmission system according to claim 1, wherein when the second peripheral gateway is going to retrieve the first audio data, the second peripheral gateway provides a first talk request signal to the first peripheral agent device for establishing a third communication link, wherein the first peripheral agent device transmits the first audio data to the second peripheral gateway via the third communication link and outputs the first audio data via the first internal audio device.

3. The audio data transmission system according to claim 2, wherein the first peripheral agent device outputs the second identification code to the connection management unit for the connection management unit to determine whether the second peripheral gateway has the authority to retrieve the first audio data, and if the second peripheral gateway has the authority to retrieve the first audio data, the connection management unit informs the first peripheral agent device to establish the third communication link.

4. The audio data transmission system according to claim 1, wherein when the first peripheral gateway is going to share the first audio data with the second peripheral gateway, the first peripheral gateway outputs a broadcasting request signal and a sharing list to the connection management unit, which responds to the broadcasting request signal by establishing a fourth communication link, and the first peripheral agent device outputs the first audio data via the fourth communication link.

5. The audio data transmission system according to claim 4, wherein the connection management unit further responds to the sharing list by informing the second peripheral agent device to receive the first audio data and outputting the first audio data via the first internal audio device.

6. The audio data transmission system according to claim 1, wherein the first peripheral agent device is further coupled to a second internal audio device.

7. The audio data transmission system according to claim 6, further capable of transmitting a second audio data between the first internal audio device and the second internal audio device;
wherein, when the second peripheral gateway is going to transmit the second audio data with the first peripheral gateway, the second peripheral gateway outputs a second talk request signal to the connection management unit, which responds to the second talk request signal by establishing a fifth communication link between the first peripheral gateway and the second peripheral gateway, the first peripheral gateway and the second peripheral gateway are connected by the fifth communication link for transmitting the second audio data and output the second audio data via the first internal audio device and the second internal audio device respectively.

8. The audio data transmission system according to claim 1, wherein both the first peripheral agent device and the second peripheral agent device are an embedded system, and the first peripheral agent device and the second peripheral agent device comprise:
a first processor responding to the connection management server by establishing the corresponding third and fourth communication link;
a first audio coder/decoder (CODEC) for compressing the first audio data; and
a first encryption/decryption device for encrypting/decrypting the first audio data.

9. The audio data transmission system according to claim 8, wherein the first peripheral agent device and the second peripheral agent device along with the first main system unit and the second main system unit are disposed in the first PC blade and the second PC blade, respectively.

10. The audio data transmission system according to claim 1, wherein both the first peripheral gateway and the second peripheral gateway are embedded systems, and the first peripheral gateway and the second peripheral gateway comprise:
a second processor for providing the corresponding first and second identification code to the connection management server and establishing the corresponding first and second communication links;
a second audio coder/decoder for compressing the first audio data and the second audio data; and
a second encryption/decryption device for encrypting/decrypting the first audio data and the second audio data.

11. The audio data transmission system according to claim 1, wherein both the external audio device and the internal audio device are universal serial bus (USB) audio devices.

12. An audio data transmission method for transmitting an audio data between a main system unit of a PC blade of a blade PC and an external audio device for enabling an internal audio device to retrieve the audio data, the audio data transmission method comprising:
(a) providing a first identification code by a first peripheral gateway coupled to the external audio device;
(b) responding to the first identification code by pairing the first peripheral gateway with a first peripheral agent device to establish a first communication link for connecting the first client peripheral agent device with the first peripheral agent device;
(c) transmitting the audio data from the main system unit to the external audio device via the first peripheral agent device, the first communication link and the first peripheral gateway;
(d) providing a second identification code by a second peripheral gateway coupled to the internal audio device;
(e) responding to the second identification code by pairing the second peripheral gateway with a second peripheral agent device to establish a second communication link for connecting the second client peripheral agent device with the second peripheral agent device;
(f) providing a talk request signal by the second peripheral gateway;
(g) responding to the second identification code by determining whether the second peripheral gateway has the authority to retrieve the audio data, if yes, performing step (h); and
(h) responding to the talk request signal by establishing a third communication link for connecting the first peripheral agent device with the second peripheral gateway so as to transmit the audio data via the third communication link and the second peripheral gateway between the main system unit and the external audio device.

13. An audio data transmission method applied in a blade PC for transmitting an audio data between a main system unit of a PC blade and an external audio device, wherein the main system unit shares the audio data with an internal audio device, and the audio data transmission method comprises:
(a) providing a first identification code by a first peripheral gateway coupled to the external audio device;
(b) responding to the first identification code by pairing the first peripheral gateway with a first peripheral agent device to establish a first communication link for connecting the first client peripheral agent device with the first peripheral agent device;
(c) transmitting the audio data from the main system unit to the external audio device via the first peripheral agent device, the first communication link and the first peripheral gateway;
(d) providing a second identification code by a second peripheral gateway coupled to the internal audio device;
(e) responding to the second identification code by pairing the second peripheral gateway with a second peripheral agent device to establish a second communication link for connecting the second client peripheral agent device with the second peripheral agent device;
(f) providing a broadcasting request signal and a sharing list by the first peripheral gateway;
(g) responding to the broadcasting request signal by establishing a third communication link via which the first peripheral agent device outputs an audio data; and (h) inputting the audio data to the second peripheral gateway and broadcasting the audio data via the internal audio device.

14. The audio data transmission method according to claim 13, wherein between step (g) and step (h), the method further comprises:

(g') responding to the sharing list by determining whether the second peripheral gateway is going to receive the audio data, if yes, performing step (h).

* * * * *